Patented Sept. 21, 1943

2,330,087

UNITED STATES PATENT OFFICE 2,330,087

STABILIZED VINYL POLYMER

Leo J. Stage, Roselle Park, and Mortimer T. Harvey, East Orange, N. J., assignors to Harvel Research Corporation, a corporation of New Jersey No Drawing. Application May 31, 1941, Serial No. 396,164

4 Claims. (Cl. 260—86)

The present invention relates to compositions of matter in which a plasticised polyvinyl chloride has incorporated with it a color stabilizer which serves to keep the polyvinyl chloride from changing color or darkening when it is subjected to heating such as in the hot plastic mill and in hot extrusion dies.

The various polyvinyl esters which are comprised entirely, or partly of polyvinyl chloride are found to break down sufficiently turn then to a reddish brown color when subjected to heat such as is met or developed in the regular mixing apparatus and in extruding dies. We have found that a small percentage of a tertiary-alkyl urea mixed in with the vinyl ester and its plasticiser will prevent this discoloration.

Example 1.—A composition mixed on the hot rubber mill was composed, as follows: 450 grams of "Vinylite VYNW" (interpolymer of 95% vinyl chloride and 5% vinyl acetate), 150 grams tricresyl phosphate, 75 grams di - 2 - ethylhexyl phthalate and 27 grams tertiary amyl urea.

The tertiary amyl urea, used as color stabilizer, represents 5.94% by weight of the vinyl polymer.

The tertiary amyl urea showed definite stabilizing effect, without it the same vinylite-plasticiser turns reddish brown when milled on a hot plastics mill. The reddish brown color developed with heat and iron metal contact is a sign of resin decomposition.

Example 2.—A batch made of 450 grams of "Vinylite VYNW," 150 grams di-2 ethyl hexyl phthalate, 75 grams tricresyl phosphate and 27 grams tertiary amyl urea showed the same color stabilizing effect as did the batch of Example 1.

Example 3.—A batch was made up the same as in Example 1 except that 27 grams of tertiary butyl urea was used instead of the 27 grams of tertiary amyl urea.

Tertiary butyl urea also is a stabilizing agent and in some compositions is better than tertiary amyl urea.

Example 4.—A small amount of surface sublimation was noted in some milled batches on standing at room temperature. To overcome this sublimation the following stabilizer was prepared.

Heat 1 gram mole weight of lauric acid to 70° C. and add and stir in 1 gram mole weight of tertiary butyl urea and allow batch to cool to room temperature, (200.3 g. lauric acid and 116.6 g. tertiary butyl urea).

450 grams of "Vinylite VYNW," 225 grams of tricresyl phosphate and 9 grams of the reaction product of lauric acid and tertiary butyl urea (as color stabilizer) were mixed and compounded on hot plastic mill.

The amount of stabilizer used is about 2% of the polyvinyl ester used, and this stabilizer was found to be efficient for stabilizing the color of "Vinylite VYNW" with no surface sublimation.

Example 5.—A batch comprising 450 grams of "Vinylite VYNW," 150 grams tricresyl phosphate, 75 grams di-2-ethylhexyl phthalate and 9 grams of the stabilizer of Example 4 (lauric acid-tertiary butyl urea reaction product) were compounded on hot mill.

Example 6.—450 grams of "Vinylite VYNW," 150 grams of di-2-ethylhexyl phthalate, 75 grams of tricresyl phosphate and 9 grams of stabilizer of Example 4 (lauric acid-tertiary butyl urea reaction product) were compounded on hot mill.

In an experimental way factory size batches of Examples 5 and 6 were found to mill and extrude satisfactorily.

The products of the above examples are used as electrical and optical tubings, and can also be fabricated in a belt or rod form for general use.

Although a particular polyvinyl chloride is given in the illustrative examples it is to be understood that the color stabilizer of the present invention is effective on polyvinyl chlorides generally and more particularly on polyvinyl chlorides running from 100% vinyl chloride content down to 5% vinyl chloride content, for example, in copolymers of vinyl chloride and vinyl acetates the vinyl chloride content can be from 95% to 5% and the vinyl acetate can be from 5% to 95%.

And in the use of the fatty acid for preventing blooming the fatty acid can be used in amounts from one one-hundredth of a molecular equivalent to one molecular equivalent with respect to the amount of tertiary alkyl urea used. Illustrative examples of fatty acids suitable for this use are lauric acid, stearic acid, and palmitic acid.

Having thus described our invention, what we claim and desire to protect by Letters Patent is:

1. A thermoplastic composition of matter comprising a polyvinyl chloride, a plasticizer therefor and a color stabilizer comprising a reaction product of a tertiary alkyl urea and a saturated fatty acid having 12 to 18 carbon atoms in the molecule.

2. In combination with a thermoplastic polyvinyl chloride, a color stabilizing agent for said polyvinyl chloride comprising the reaction product of a saturated fatty acid having 12 to 18 carbon atoms in the molecule and a tertiary alkyl urea having from four to six carbon atoms in the tertiary alkyl group.

3. In combination with a thermoplastic polyvinyl chloride, a color stabilizing agent for said polyvinyl chloride comprising the reaction product of a tertiary alkyl urea having from four to six carbon atoms in the tertiary alkyl group and from one one-hundredth of a molecular equivalent to one molecular equivalent of a saturated fatty acid having 12 to 18 carbon atoms in the molecule.

4. A thermoplastic composition of matter comprising a polymer selected from the group consisting of polyvinyl chloride and copolymer of vinyl chloride and vinyl acetate, a plasticizer therefor, and a color stabilizer comprising a reaction product of tertiary alkyl urea having from four to six carbon atoms in the tertiary alkyl group and a saturated fatty acid having twelve to eighteen carbon atoms in the molecule.

LEO J. STAGE.
MORTIMER T. HARVEY.